United States Patent [19]
Gorman

[11] 3,866,923
[45] Feb. 18, 1975

[54] SEALING ROD WIPER

[76] Inventor: Gerald W. Gorman, Rt. 2, Box 320, Midlothian, Tex. 76065

[22] Filed: Oct. 26, 1973

[21] Appl. No.: 409,905

[52] U.S. Cl. .................. 277/24, 277/178, 277/206, 215/210 B
[51] Int. Cl. ............................................. F16j 15/16
[58] Field of Search ............ 277/24, 178, 206, 205; 215/210 B

[56] References Cited
UNITED STATES PATENTS

| | | | |
|---|---|---|---|
| 2,936,933 | 5/1960 | Malec | 277/178 X |
| 3,445,121 | 5/1969 | Lineker | 277/178 |
| 3,549,154 | 12/1970 | Jones | 277/24 |
| 3,554,569 | 1/1971 | Gorman | 277/205 |

Primary Examiner—Samuel B. Rothberg

[57] ABSTRACT

An improvement in a rod wiper assembly for sealing intermediate a cap ring on a hydraulic cylinder or the like and a rod running concentrically therewithin characterized by a sealing rod wiper having a base ring that conformingly fits within the recess of the cap ring; a neck portion connected with the base ring and extending exteriorly thereof and in the annular space between the cap ring and the rod; and an annular exterior wiper portion that is connected with the neck portion and adapted to form an interference and sealing fit between the exterior planar surface of the cap ring and the rod. The rod wiper is formed of an elastomeric material having a resiliency in compression that serves to maintain the interference fit. Yet, only the exterior wiper portion bears against the rod for reduced heat in operation. Because of the compression and interference fit, the sealing exterior wiper portion maintains the rod clean and prevents the dirt and the like on the exterior of the rod from being drawn inwardly and ruining an interiorly disposed seal. Also disclosed are specific structural embodiments enabling effecting the invention.

9 Claims, 7 Drawing Figures

PATENTED FEB 18 1975  3,866,923
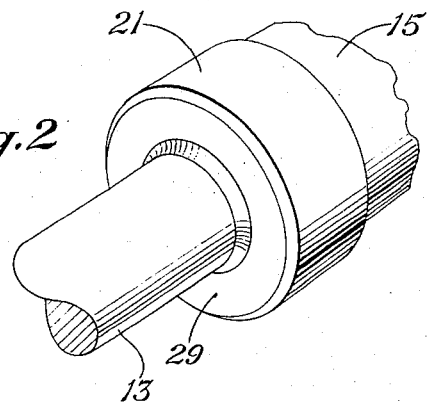
Fig.2
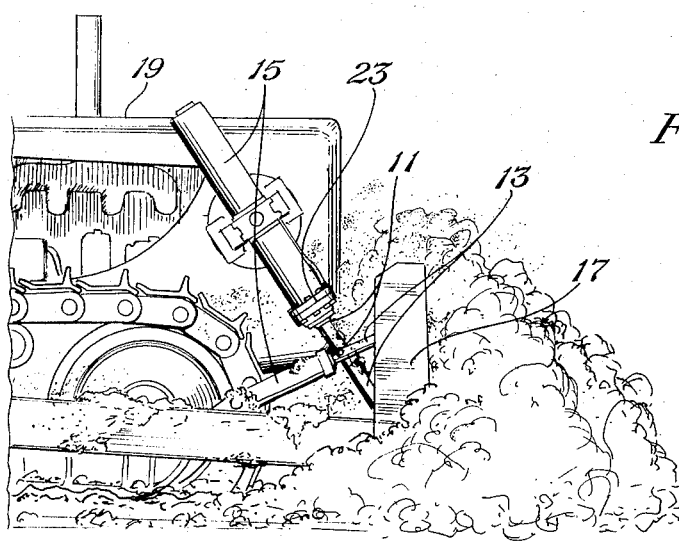
Fig.1
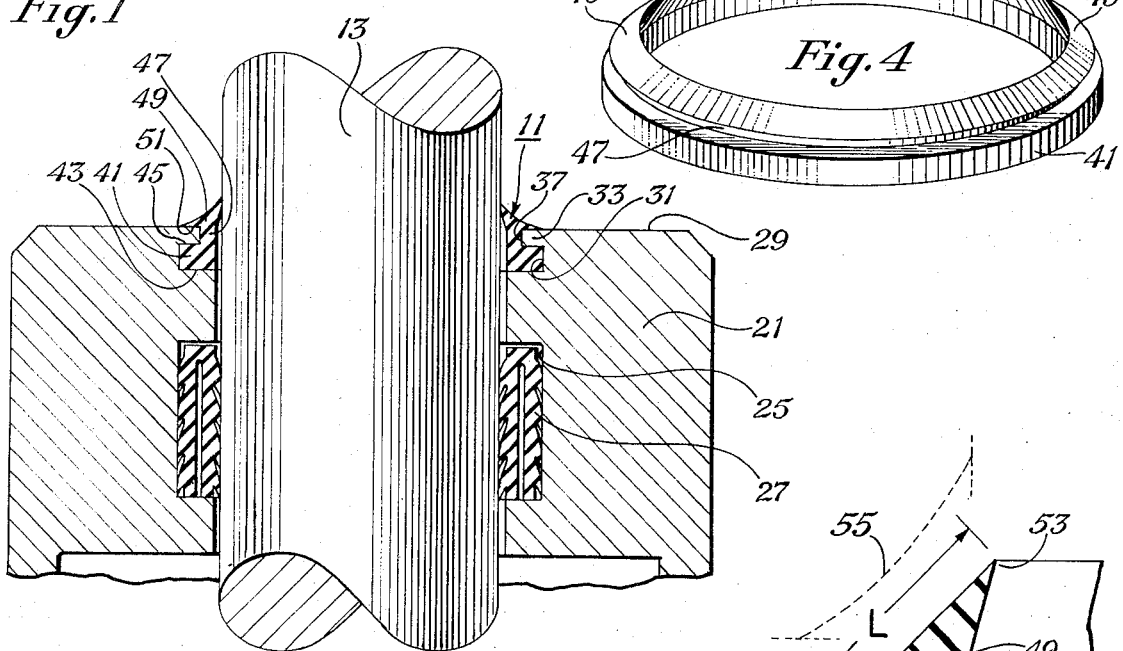
Fig.3
Fig.4
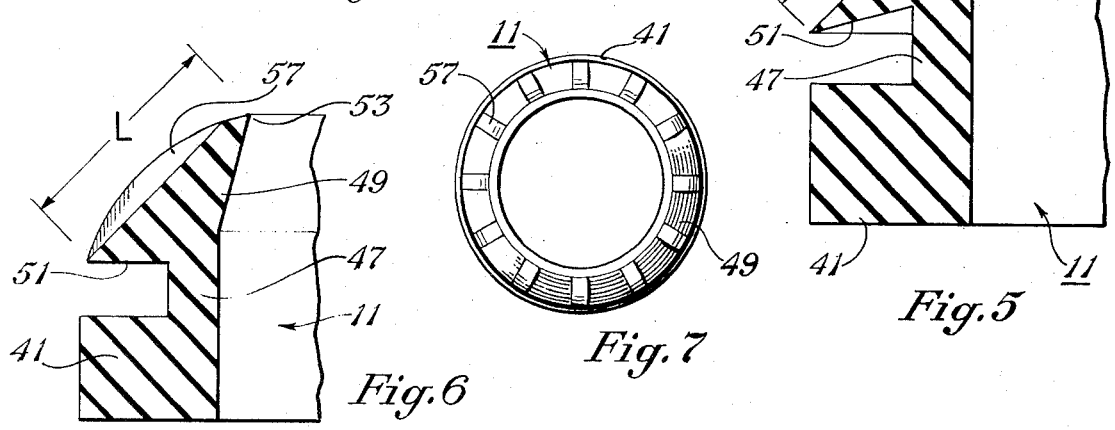
Fig.6  Fig.7  Fig.5

SEALING ROD WIPER

BACKGROUND OF THE INVENTION

1. Field of the Invention

This invention relates to wipers for rods or other cylindrical surfaces traversing longitudinally of the wiper and a holder therefor, such as a cap ring. More particularly, this invention relates to a wiper for use with a longitudinally movable piston rod traversing concentrically interiorly within a cap ring on a hydraulic cylinder or the like.

2. Description of the Prior Art

Fluid seal devices of a type suitable for use with a rod and cylinder under pressure loading conditions have in the past comprised a wide variety. Such prior art seal devices have been subject to a number of disadvantages, including a tendency to early failure, particularly due to the drawing inwardly of dust, water and the like from adverse exterior environments that are sucked into the seal upon retraction of the cylinder rod, or piston rod.

To try to prevent this premature failure, a wide variety of rod wipers have been employed in the past; for example, leather cups have been disposed about the rod and drawn tightly with drawstrings or the like. The closest prior art of which I am aware have comprised seals having base rings that seat within a recess in a cap ring and have flexible flanges of elastomeric material that protrude away from the base ring and radially interiorly to bear upon the rod to attempt to remove the dirt and the like as the rod is drawn inwardly. One of the primary defects of the prior art has been that the elastomeric flange that extends away from the base ring and interiorly against the rod has, itself, been subject to premature failure and has not had adequate strength to clean the rod of tenaciously adhering dirt or the like. Moreover, the dirt, debris and the like that was removed by the rod wiper tended to follow down the wiper and become embedded intermediate the wiper seal base and the cap ring so as to destroy the close fit therebetween and contribute to premature failure.

Accordingly, it is an object of this invention to provide a rod wiper that obviates the disadvantages of the prior art.

Particularly, it is an object of this invention to provide a rod wiper that provides a relatively high strength and sealing fit with both the rod and the cap ring to obviate the disadvantages of the prior art.

These and other objects will become apparent from the following descriptive matter, particularly when taken in conjunction with the drawings.

BRIEF DESCRIPTION OF THE DRAWINGS

FIG. 1 is a partial side elevational view of apparatus in operation employing one embodiment of this invention.

FIG. 2 is a partial isometric view of a hydraulic ram in a typical installation and employing a sealing rod wiper in accordance with this invention.

FIG. 3 is a partial side elevational view, partly in section, showing the sealing rod wiper of FIG. 2.

FIG. 4 is an isometric view of the sealing rod wiper of FIG. 3.

FIG. 5 is a partial cross sectional view of another embodiment of a sealing rod wiper similar to that shown in FIG. 4.

FIG. 6 is a partial cross sectional view of still another embodiment of a sealing rod wiper in accordance with this invention.

FIG. 7 is a top elevational view of the sealing rod wiper of FIG. 6.

DESCRIPTION OF PREFERRED EMBODIMENTS

FIG. 1 shows rod wipers 11 in an installation in which they wipes dirt, debris, water and the like from rods, such as piston rods 13, that are extended and withdrawn from cylinders 15 that are powered by pressurized fluid; for example, high pressure hydraulic fluid (not shown). As illustrated in FIG. 1, the respective rams formed by the piston rods and cylinders 13 and 15 are employed to control the blade 17 on dozer 19. Obviously, hydraulic rams are employed in a wide variety of situations that have no relationship to the illustrated embodiment. As can be seen in FIGS. 2 and 3, however, there is an element in common with all such installations. Therein, the piston rods 13 traverse longitudinally and concentrically within a cap ring 21 that is affixed to a cylinder 15 by any conventional means. For example, the cap ring 21 may be affixed to the cylinder by bolts and flanges 23, FIG. 1, or by being screwed thereonto, as illustrated in FIG. 2.

Ordinarily, the cap ring 21 will have a suitable recess 25 having a seal 27 disposed therein for sealing engagement with the cap ring 21 and the rod 13 to retain a high pressure fluid, such as hydraulic fluid, within the cylinder 15. One excellent seal for such an installation is the "dynamic pressure seal devices" described in my patent application of the same title, U.S. Pat. No. 3,554,569. The descriptive matter therein that is pertinent to the seal 27 is incorporated hereinto by reference. It is sufficient to note that the seal 27 provides excellent and long lasting sealing quality. A still further improvement has been described in my copending application entitled "Dynamic Pressure Seals Having Even Wear," filed even date herewith. The descriptive matter contained in that application is incorporated by reference hereinto for such purposes as my be necessary; for example, to support any combination claims.

To prevent premature failure of the seal 27, the rod wiper 11 is installed to clean the rod 13 of debris, dirt, water and the like as the rod 13 is withdrawn interiorly of the cylinder 15; and, specifically, interiorly along the longitudinal axis of the rod wiper 11.

As illustrated, the piston rod 13 has a smooth external cylindrical surface. The cap ring 21 has a planar exterior surface 19. In addition to the first recess 25, the cap ring 21 also has a recess 31, FIG. 3, disposed concentrically about the rod 13 for receiving a base ring of the rod wiper 11. As illustrated, the recess 31 has a substantially rectangular cross sectional shape. The cap ring 21 also has a shoulder 33 extending interiorly of the recess 31 to define a concentric cylindrical surface 37 disposed annularly about the rod 13. An annular space is defined intermediate the rod 13 and the concentric surface 37.

Referring to FIGS. 3 and 4, it can be seen that the rod wiper 11 has an annular base ring 41 that has a circular, or cylindrically tubular, configuration and is rectangular in cross section for fitting within the rectangular recess 31 of the cap ring 21. The base ring 41 has an inner diameter that is larger than the diameter of the rod 13 so as to have a clearance therebetween, as illustrated in FIG. 3. Its outer diameter is no more than; and, preferably, slightly less than; the inner diameter of the recess 31 in the cap ring 21. Specifically, the base ring 41 loosely conformingly fits within the recess 31 to allow lateral shifting sufficient to maintain good sealing contact with the rod, even with side loading of the rod. By "loosely conformingly" is meant about the same tolerance as is employed between the rod and whatever rod guide is employed. For example, ordinarily, the outside diameter of the base ring 41 will be smaller than the inner diameter of the recess 31 by an amount within the range of 0.003–0.035 inch, depending upon the size of the rod. The base ring 41 also is dimensioned and has the cross sectional shape to conformably fit within the recess 31. The base ring 41 has a base or innermost, surface 43 and an outermost surface 45. The terms "innermost" and "outermost" are employed in this context to signify direction with respect to the interior of the cylinder 15, rather than the radial direction.

The rod wiper 11 has a neck portion 47 that is connected with the outermost surface 45 of the base ring 41 at its radial interior and extends away from the base ring 49 in the annular space intermediate the concentric surface 37 and the rod 13. Expressed otherwise, the neck portion 47 has a length that is the same as the thickness of the shoulder 33; that is, the same length as the illustrated concentric cylindrical surface 37. In this way, the neck portion is adapted to extend upwardly through the annular space between the rod 13 and the concentric cylindrical surface 37. The neck portion loosely conformingly engages the concentric cylindrical surface similarly as described with respect to the base ring 41 hereinbefore. The neck portion has, however, an inner diameter larger than the outer diameter of the rod 13 so as to allow free movement of the rod reciprocally and longitudinally thereof.

The rod wiper 11 also includes an annular exterior wiper portion, or enlarged head portion, 49 that is connected with the neck portion 47 and adapted to fit exteriorly of the cap ring 21. The exterior wiper portion 49 comprises an enlarged annular head having an inner wiper diameter less than the first diameter of the neck portion so as to bear sealingly against the rod 13. In fact, the enlarged annular head has a radially interior lip having a diameter less than the diameter of said rod 13 so as to form the interference fit therewith when said rod 13 is inserted therethrough. The enlarged annular head has an inner surface 51 that is adapted to provide an operationally planar and interference fit with the planar surface 29 of the cap ring 21. The inner surface 51 terminates in a radially outer and sealing diameter that is larger than the diameter of the concentric cylindrical surface 37 so as to sealingly engage the planar surface 29 exteriorly of the concentric cylindrical surface 37. As illustrated, the inner surface 51 is coplanar with the planar exterior surface 29 when installed.

The annular exterior wiper portion 49 has a compression means intermediate the inner wiper diameter and the outer diameter for maintaining the respective wiping and sealing contacts with the rod 13 and the cap ring 21. As illustrated, the compression means comprises having a length of solid compressible material that is longer than is the straight line between the annular rings of contact with the rod 13 and the planar exterior surface 29 in the installed position. In this way, when the rod wiper is installed, the annular head is in compression so that the respective rings of contact are maintained. Expressed otherwise, the radial interior lip of the wiper portion 49 is maintained in compressional and sealing engagement with the exterior surface of the rod 13 so as to wipe cleanly any debris, water, dirt or the like from the surface of the rod as the rod is withdrawn inwardly through the rod wiper 11. At the same time, the outer lip and the inner surface 51 are maintained in sealing contact with the planar surface 29 of the cap ring 21 because of the compressional forces. This lends itself to exceptionally clean and long lived wiping action on the rod and prevents the incursion of debris, dirt, water and the like into the cap ring so as to destroy the conforming engagement and long life formed by the closely fitting rod wiper and the interior of the cap ring 21.

In operation, the seal 27 is installed in recess 25 of the cap ring 21. The rod wiper is installed in the recess 31 of the cap ring 21 with the base and neck portion conformingly engaging the respective recess 31 and the concentric cylindrical surface 37 of the shoulder 33. The inner surface 51 of the wiper portion 49 comprising the annular exterior wiper portion sealingly engages the clean planar surface 29 of the cap ring 21. The rod 13 is inserted through the seal 27 after it is installed. The rod 13 is also inserted through the rod wiper 11 after it is installed. In so doing, the enlarged head portion of the rod wiper 11 is put in compression so as to maintain the respective sealing engagements described hereinbefore. Yet, the rod is able to be moved longitudinally of the rod wiper with very little heat generated, because of the resiliency of the wiper portion 49 and the lack of compression forces bearing against the rod by the base ring 41 and the neck portion 47. The cap ring 21 may be then tightened down onto its cylinder 15. The seal 27 will hold against any fluid employed to operate the ram, or move the piston and piston rod 13 back and forth with respect to the cylinder 15. All dirt, water and the like that would lead to premature failure are wiped from the rod 13 by the rod wiper 11. Because the rod wiper 11 sealingly engages the planar surface 29, the dirt, water and the like run harmlessly off the cap ring 21 and do not lead to premature failure of the rod wiper 11; and, thereafter, to premature failure of the seal 27. The rod wiper and the seal are trouble-free and require very little maintanence and care.

Another embodiment of the invention is illustrated in FIG. 5. The embodiment of FIG. 5 is essentially the same as has been described hereinbefore with respect to the embodiment of FIGS. 1–4 and the respective base ring 41, neck portion 47 and wiper portion 49 are constructed to have the features and operate as described hereinbefore with respect to the embodiment of FIGS. 1–4. In the embodiment of FIG. 5, however, the inner surface 51 comprises a frusto-conical surface in the relaxed and pre-installed position, rather than having the inner lip 53 initially protrude interiorly so far. Because of the resiliency of the material of which the rod wiper is made, however, the inner surface 51 readily becomes planar when the rod wiper 11 is installed and the inner surface 51 sealingly engages the planar surface 29, similarly as illustrated in FIG. 3. The raising of the inner surface 51 to the planar level of the planar exterior surface 29 will automatically effect a lessening of the diameter of the inner lip portion 53 and cause it to more closely hug, or provide a tighter interference fit with, the rod 13 when the rod 13 is installed therethrough. In the installed position, the rod wiper external surface will resemble the configuration illustrated by the dashed lines 55. The configuration illustrates the compression of the intermediate section of the enlarged wiper portion 49 when the forced interference fit is effected by the insertion of the rod 13 through the rod wiper 11.

Still another embodiment is illustrated in FIGS. 6 and 7. Therein, the base ring 41, neck portion 47 and annular exterior wiper portion 49 are the same as described hereinbefore. As described with respect to FIGS. 1-5, the annular exterior wiper portion 49 has a length of material L before installation that is no less than the straight line distance between the points of contact between the enlarged head portion at the outer diameter with the planar surface 29 and the inner diameter with the rod 13 in the installed position. Preferably, L is greater than the installed straight line distance for the desired interference fit. In the embodiment of FIGS. 6 and 7, less material is employed and the length L is only slightly greater if at all, because the compression means includes a plurality of ribs 57 that are arcuate and add to the compressional strength of the wiper portion 49. The ribs 57 extend longitudinally of the enlarged head portion and are disposed at a plurality of radial locations equally spaced around the wiper portion 49. This adds stiffness and requires less overlap in the interference fit effected. As illustrated, the inner surface 51 is a planar surface that will readily sealingly coengage the planar exterior surface 29. In the embodiment of FIGS. 6 and 7, consequently, less flexure of the neck portion 47 is required, since the inner surface 51 is already planar to coengage the planar exterior surface 29. The inner lip 53 is characterized by an inner frusto-conical surface connecting it with the inner diameter of the neck portion 47 and the base ring 41. When the rod 13 is inserted therethrough, a slight amount of compression of the material in the preferred wiper portion 49 is effected intermediate the respective rings of contact, as described hereinbefore. The resulting compressional force maintains the respective rings of contact and provides the sealing, cleaning action of the rod wiper 11 on the rod 13 and the sealing and conforming fit of the inner surface 51 with the planar exterior surface 29 of the cap ring 21, FIG. 3.

The installations and operations of the embodiments of FIGS. 5-7 are substantially the same as described hereinbefore with respect to FIGS. 1-4.

From the foregoing, it can be seen that this invention provides the objects delineated hereinbefore and alleviates the difficulties of the prior art.

While a cylindrical piston rod 13 has been described hereinbefore, the piston rod may have any other desired shape as necessary for a given installation. For example, it may be necessary to employ a square piston rod 13 to prevent twisting of certain cantilevered elements. The rod wiper 11 and the cap ring 21, with its recesses, may be made of commensurate shape to fit the external shape of the rod 13 as necessary. Such unusually shaped rods and rod wipers are, ordinarily, specialty items of commerce. They are deemed within the scope of this invention, however, if they employ the principle of the enlarged exterior head portion such that the wiper portion of the rod wiper is in compression to sealingly engage the planar surface of a cap ring 21 and the external surface of the rod 13, regardless of the cross sectional shape of the rod 13; and the terminology "diameter" is to be interpreted in terms of distance perpendicular to the longitudinal axis of the rod 13.

The rod wiper 11 is preferably rubber or rubber-fabric composition. In any event, it has a resiliency and a degree of elasticity that is common with elastomeric materials such that it will retain the compressive forces on the respective rings of contact and resist becoming brittle and permanently deformed so as to allow the incursion of dirt, debris, water and the like. Any of the conventional elastomeric materials may be employed. For example, suitable materials include the natural and synthetic rubbers. The natural and synthetic rubbers are defined in the respective chemical dictionaries, such as HACKH'S CHEMICAL DICTIONARY and that descriptive material is incorporated hereinto by reference. The exact materials chosen will be those resistant to the fluids and environment. Ordinarily, the wipers 11 comprise the oil resistant synthetic rubbers; such as, Buna N or Neoprene: styrene-butadiene; butyl rubber; polyisoprene rubber; and polybutadiene rubber.

While a preferred loosely conforming fit of the rod wiper within the cap ring has been described, an exact fit may be employed if the "heavy" and "loose" sealing engagement of the wiper with a side-loaded rod can be tolerated.

Although this invention has been described with a certain degree of particularity, it is understood that the present disclosure has been made only by way of example and that numerous changes in the details of construction and the combination and arrangement of parts may be resorted to without departing from the spirit and the scope of this invention.

What is claimed is:

1. A rod wiper for sealing intermediate a cap ring and a rod disposed concentrically therewithin; said cap ring having a planar exterior surface, a recess disposed concentrically about said rod, and extending inwardly of said recess a shoulder defining a concentric surface of smaller diameter than said recess and larger diameter than said rod; said rod wiper comprising:

a. an annular base ring adapted for conformably fitting within said recess of said cap ring and having a first inner diameter larger than the first outer diameter of said rod, and having operationally innermost and outermost surfaces;

b. an annular neck portion connected with said outermost surface of said base ring at its radial interior and extending away from said base ring at its radial interior; said neck portion being adapted for extending upwardly through the annular space between said rod and said concentric surface; said neck portion also having an inner diameter greater than a first predetermined outer diameter of said rod and having a second outer diameter no larger than a predetermined second inner diameter of said concentric surface and adapted to loosely and conformingly fit said concentric surface; and c. an annular exterior wiper portion connected with said neck portion and adapted to fit exteriorly of said cap ring; said exterior wiper portion having an enlarged annular head having an inner wiper diameter that is less than said first inner diameter of said neck portion and less than said first predetermined diameter of said rod so as to form an interference to fit with said rod when said rod is inserted therethrough; said enlarged head having an outer sealing diameter greater than said predetermined second inner diameter of said concentric surface and having an inner surface that is adapted to provide an operationally planar fit with said planar surface of said cap ring; said exterior wiper portion having a compression means intermediate said wiper inner diameter and said sealing outer diameter for maintaining respective wiping and sealing contacts with said rod and said cap ring;

whereby said rod wiper can be installed with its base within the recess within said cap ring and said rod inserted therethrough and said wiper portion is forced into interference fit with said rod and said cap ring to provide exceptionally long lived and clean wiping action on said rod.

2. The rod wiper of claim 1 wherein said base ring has a rectangular cross sectional shape fitting within a rectangularly shaped recess in said cap ring.

3. The rod wiper of claim 1 wherein said compression means comprises having a length of solid material that in its pre-installed configuration is slightly longer than the straight line between the respective rings of contact of said inner wiper diameter with said rod and said outer sealing diameter with said cap ring such that the material in said enlarged head is under compression in the installed position with said rod extending therethrough.

4. The rod wiper of claim 3 wherein said compression means includes arcuate ribs extending longitudinally of the exterior surface of said wiper portion and spaced at a plurality of peripheral locations therearound.

5. The rod wiper of claim 1 wherein said compression means includes arcuate ribs extending longitudinally of the exterior surface of said wiper portion and spaced at a plurality of peripheral locations therearound.

6. The rod wiper of claim 1 wherein said inner surface of said wiper portion is a planar surface for fitting the planar surface of said cap ring.

7. The rod wiper of claim 1 wherein said inner surface of said wiper portion is a frusto-conical surface that is adapted to become an operationally planar surface in interference fit with said planar surface of said cap ring when installed thereonto; said force fitting of said frusto-conical surface onto said planar exterior surface of said cap ring being effected by flexure of said neck portion and allowing compression of said wiper portion when said rod is inserted therethrough.

8. The rod wiper of claim 1 wherein said rod wiper comprises an elastomeric material that allows compression of said wiper portion to retain said interference fit.

9. A combination comprising:
a. a cap ring having a planar exterior surface and adapted to be sealingly fitted onto a cylinder or the like for holding a high pressure fluid therewithin; said cap ring having a recess disposed concentrically therewithin and having extending inwardly of said recess a shoulder defining a concentric cylindrical surface of smaller diameter than said recess; said cap ring having a second sealing recess of substantially rectangular cross sectional shape;
b. a rod disposed concentrically within said cap ring and said concentric cylindrical surface and having a smaller diameter than said concentric cylindrical surface so as to define an annular space therebetween;
c. a seal means disposed in said second sealing recess of said cap ring and sealingly engaging said cap ring and said rod; and
d. a rod wiper having an annular base ring comformably fitting within said recess of said cap ring and having an inner diameter larger than the diameter of said rod; said base ring having inner most and outermost surfaces; said rod wiper having an annular neck portion connected with said outermost surface of said base ring at its radial interior and extending intermediate said concentric cylindrical surface and said rod exteriorly of said base ring; said neck portion loosely conformingly fitting said concentric cylindrical surface and having an inner diameter greater than the outer diameter of said rod so as to permit free movement of said rod longitudinally of said neck portion without heating; said rod wiper having an annular exterior wiper portion connected with said neck portion and in interference fit with said rod and said planar exterior surface of said cap ring such that said rod wiper sealingly engages said rod for removing dirt and the like if said rod is drawn inwardly therethrough, while maintaining a sealing engagement with said cap ring radially exteriorly of said concentric cylindrical surface; said exterior wiper portion having a compression means for maintaining said interference fit and respective wiping and sealing contacts with said rod and said cap ring for exceptionally clean and long lived wiping action on said rod.

* * * * *